Dec. 16, 1952     P. F. ROSSMANN     2,621,544
WINDOW OPERATING DEVICE FOR VEHICLES
Filed Dec. 10, 1947     3 Sheets-Sheet 1

INVENTOR
PETER F. ROSSMANN
BY
ATTORNEY

Dec. 16, 1952      P. F. ROSSMANN      2,621,544
WINDOW OPERATING DEVICE FOR VEHICLES
Filed Dec. 10, 1947      3 Sheets-Sheet 2
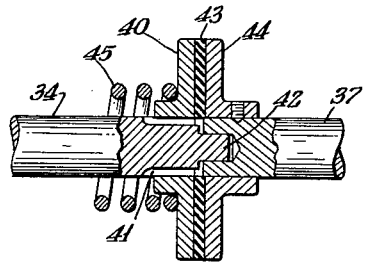
FIG. 3.
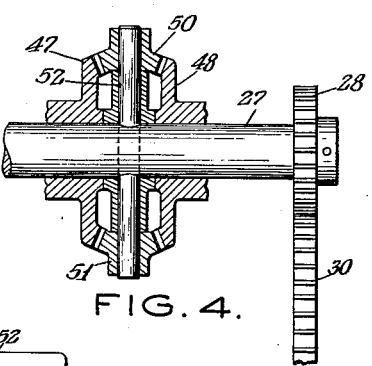
FIG. 4.
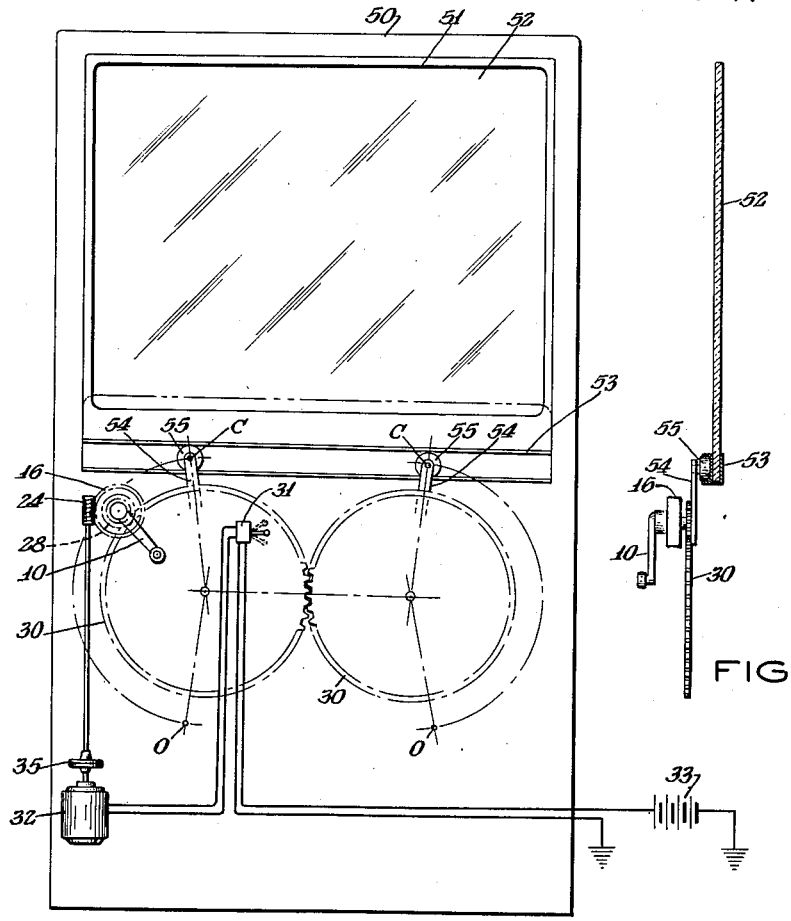
FIG. 5.
FIG. 6.
INVENTOR
PETER F. ROSSMANN
BY
ATTORNEY Dec. 16, 1952 P. F. ROSSMANN 2,621,544
WINDOW OPERATING DEVICE FOR VEHICLES
Filed Dec. 10, 1947 3 Sheets-Sheet 3

INVENTOR
PETER F. ROSSMANN
BY
ATTORNEY

Patented Dec. 16, 1952

2,621,544

UNITED STATES PATENT OFFICE 2,621,544

WINDOW OPERATING DEVICE FOR VEHICLES

Peter F. Rossmann, Morristown, N. J., assignor, by direct and mesne assignments, to Hupp Corporation, Cleveland, Ohio, a corporation of Virginia Application December 10, 1947, Serial No. 790,783

5 Claims. (Cl. 74—626)

1

The present invention relates to arrangements for raising and lowering a window, more particularly to an improved automatic window operating device for automobiles and other vehicles.

Known types of automatic window operating devices for automobiles operated by electric, hydraulic or pneumatic means require some form of major alteration in the conventional mechanism for raising and lowering the windows of standard construction. Moreover, none of the known designs provides for a satisfactory optional manual operation, in the event of failure of the automatic system.

As is evident, both damage and discomfort will result, if it is impossible to close the window of an automobile to keep out weather or to prevent theft through failure of the automatic system. Likewise, in the case of accident, when the doors become jammed and the electric, hydraulic or pneumatic systems are damaged, escape may be entirely impossible.

Accordingly, it is an object of the present invention to overcome the afore-mentioned drawbacks and disadvantages and to provide an improved arrangement for operating a window both manually and/or auomatically, substantially without any additional switching or adjusting operations when changing from one operation to the other and without any mutual interference between the automatic and manual operating systems.

Another object of the invention is to provide a device of this type which is simple in construction and cheap to manufacture, which requires little space, and which may be easily and readily installed in an automobile door and combined with existing manual window operating devices.

Further objects as well as novel aspects and features of the invention will become more apparent from the following detailed description of a few practical embodiments thereof, reference being had to the accompanying drawings forming part of this specification and wherein:

Figure 3 is a partial cross-sectional view of the friction coupling associated with the driving motor in Figure 1;

Figure 4 is a partial cross-sectional view illustrating a modified differential coupling suitable for use in connection with the invention;

2

Figure 7:
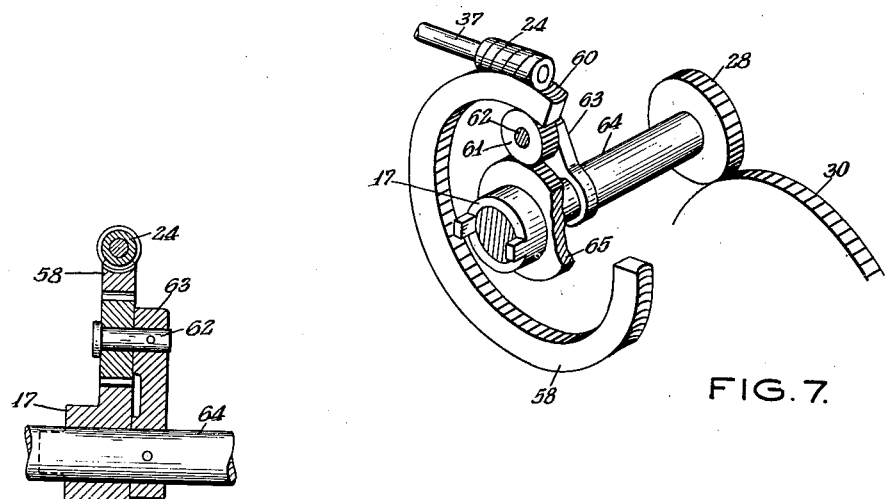
Figure 8:
Figure 9:
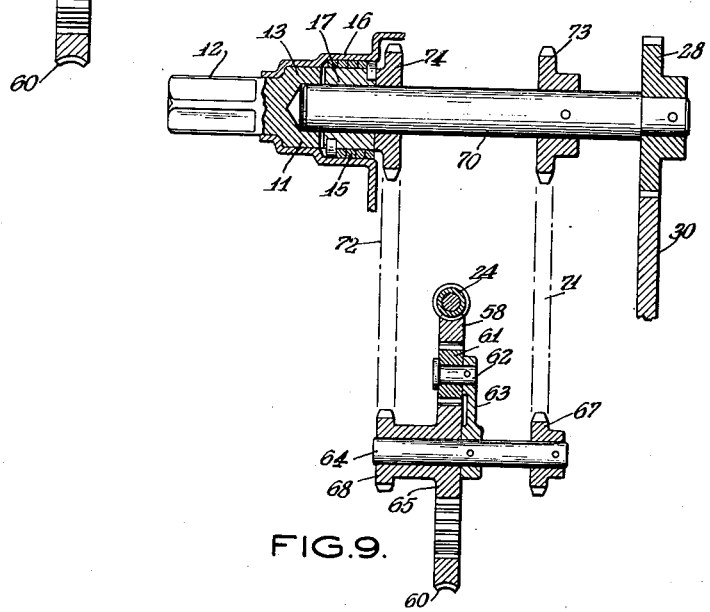

Figure 5 illustrates diagrammatically an automobile door having a window lifting system according to the invention installed therein, one wall of the door being removed to reveal the inside mechanism;

Figure 6 is a side view of the window and operating mechanism embodied in Figure 5;

Figure 7 is an isometric view and Figure 8 is a corresponding cross-sectional view of another type of differential coupling suitable for the purpose of the invention; and Figure 9 is a cross-section illustrating still another modification of a window operating system constructed in accordance with the principles of the invention.

Like reference numerals identify like parts throughout the different views of the drawings.

Figure 1:
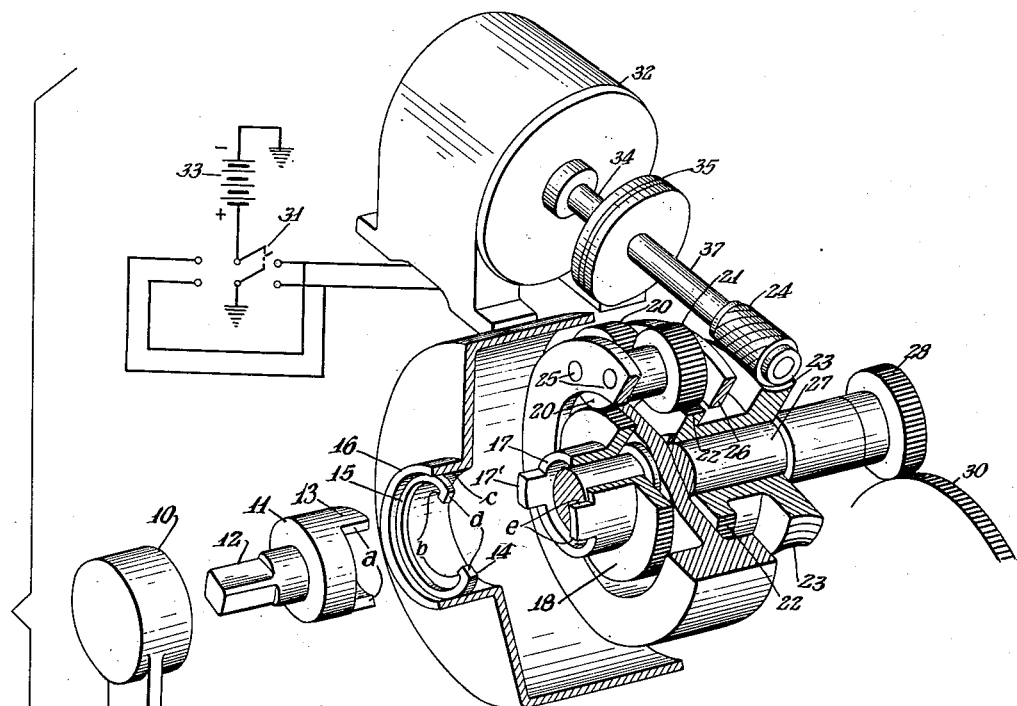
Figure 1 is an isometric "exploded" view of a combined manual and/or automatic window operating device constructed in accordance with the principles of the invention.
Figure 2:
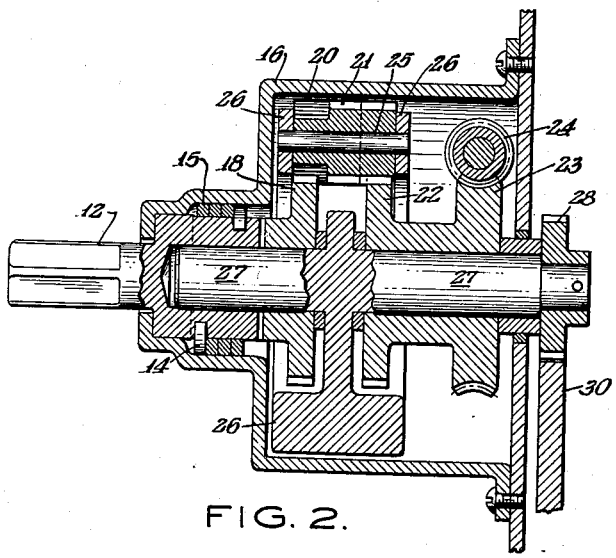
Figure 2 is a longitudinal cross-section through the differential coupling mechanism forming a main element of the device of Figure 1.

Referring to Figures 1 and 2, there is shown at 10 the conventional hand crank or operating handle serving for manually raising and lowering a window in an automobile and driving the first lugged segment 11 of a uni-directional spring clutch through a squared, keyed or flattened shaft 12, said clutch comprising a further cooperating lugged segment 17 and a clutch spring 15. When the crank 10 is rotated in either direction, the faces $a$ of the lugs 13 on segment 11 engage the inner sides $b$ of the hooks 14 of the clutch spring 15. In Figure 1, spring 15 is shown with only one coil or turn for ease of illustration, but it may consist of several coils or turns, as shown in Figure 2.

Due to the spring action of the coil 15, the latter normally frictionally engages the inner surface $c$ of the housing 16 enclosing the entire coupling device. As a result, the lugs 13 of the clutch segment 11 through their faces $a$ strike the inner sides $b$ of the hooks 14 in either direction of rotation of the crank 10, thereby pulling the spring coil 15 away from the surface $c$ in such a manner as to reduce the coil diameter and to allow rotational movement to be transmitted from the crank through the clutch 11, 15, 17 to the window operating mechanism, by causing the sides of the outer faces $d$ of the hooks 14 of spring 15 to strike the faces $e$ on the lugs 17' of the cooperating clutch segment 17.

Segment 17 is connected to or integral with the first sun or side gear 18 of a spur gear differential coupling mechanism comprising, in the example shown, a further sun or side gear 22 and a pair of cooperating planet gears or pinions 20 and 21 rotatably mounted in a rotatable differential carrier 26. More particularly, sun gear 18 meshes with planet gear 20 which in turn meshes with planet gear 21, while the latter meshes with the sun or side gear 22. Attached to the latter is a worm wheel 23 which is locked against rotation by meshing with the screw or worm gear 24. Planet gears or pinions 20 and 21 are mounted on pins 25 in the carrier 26 which through shaft 27 and gear 28 drives the conventional toothed window operating quadrant or gear 30 to be described in greater detail hereafter. In an arrangement of this type, it is evident that, since the differential elements 22 and 23 are locked against rotation by the worm 24, that the window can be either opened or closed in the usual manner by manually operating the crank 10 through rotation of the carrier 26 actuated by elements 10 to 21.

For automatic operation of the window, the double pole-double throw electric switch 31 is closed, whereby to energize a reversible electric driving motor 32 by the battery or other power source 33 and to cause rotation of the motor in either direction for opening and closing the window, respectively. The motor 32 through shaft 34, friction clutch 35, shaft 37, worm 24 and worm wheel 23 rotates the differential carrier 26 and related elements 27, 28 and 30 through the differential side gear 22 which reacts through planet gears 20 and 21 against the locked differential side or sun gear 18. More particularly, sun gear 18 is locked against rotation by the action of surface $e$ of lugs 17' of the clutch segment 17 striking the sides $d$ of the hooks 14 on clutch spring 15. This causes the spring 15 to expand and to lock tightly against the inner surface $c$ of housing 16, thereby preventing the automatic operation from affecting or imparting any rotation upon the crank or handle 10.

A construction of the type afore-described, aside from a complete independence or freedom from interference between the manual and automatic operations and the absence of any switching or other operation when changing from manual to automatic operation and vice versa, has the further advantage that the manual and automatic operations may be carried out simultaneously for advancing or retarding or otherwise regulating the opening and closing operation of the window, to suit any existing conditions or personal desires.

While a special type of uni-directional clutch has been shown connected between the manual operating member or crank 10 and the differential gear coupling, i. e. a clutch allowing of rotary motion in either direction to be transmitted from the crank to said coupling while blocking any transmission of motion in the reverse direction, equivalent uni-directional coupling or clutch means may be employed for the purpose of the invention, such as worm gear drive similar to that connecting the motor 32 with the differential coupling and shown in the drawing.

Another advantage of a combined manual and/or automatic window operating device according to the invention is the fact that all the parts and elements may be assembled to form a compact structure suitable for combination with or structural embodiment in existing window operating devices for automobiles and other vehicles.

Referring to Figure 3, there is shown a cross-section through the friction clutch 35 connecting the motor 32 with the differential coupling mechanism in Figure 1. According to this preferred construction, the clutch comprises a splined flange 40 free to move axially in spline 41 of shaft 34 which is piloted or guided in shaft 37 by an axial extension 42. The friction disc 43 may be attached either to flange 40 or flange 44 on the cooperating shaft 37 or may float freely. Spring 45 holds the friction disc 43 in contact with flanges 40 and 44 with sufficient pressure to prevent slippage during normal movement of the window, but allowing the clutch to slip when the window has reached the open or closed limit position. Such a clutch construction eliminates the need of limit switches, although such switches may be provided in place of or in conjunction with the special clutch construction shown, as will be readily understood.

Although two lugs 17' on clutch segment 17 have been shown to prevent assembly misalignment of the coupling elements, only one lug will be required, as is understood. Furthermore, in Figure 2 shaft 27 of the differential carrier 26 is shown extended in the direction opposite to the gear 28 to support or pilot elements 13 and 18 and to maintain accurate alignment of the various parts, in a manner readily understood.

As will be further understood, the two-way differential coupling and uni-directional clutch mechanism interconnecting the manual operating member 10 and driving motor 32, on the one hand, with the window operating mechanism, on the other hand, is subject to variations and modifications by substituting equivalent arrangements or parts for those shown, in accordance with the broader scope and spirit of the invention. Thus, referring to Figure 4, there is shown a bevel gear differential coupling replacing the spur gear differential shown in Figures 1 and 2. This construction comprises a pair of sun or side gears in the form of bevel gears 47 and 48 in uni-directional coupling connection with the crank 10 and the motor 32, respectively, in a manner similar or equivalent to that shown in Figures 1 and 2. Bevel gears 47 and 48 cooperate with a plurality of bevelled planet gears, two having been shown in the drawing at 50 and 51 and being rotatably mounted on the opposite ends of a carrier pin secured to shaft 27.

Referring to Figures 5 and 6, there is shown a window operating system of the type aforedescribed installed in a conventional automobile door 50 provided with a window opening 51 and slidable window pane 52. The latter is supported at its lower end by a channel member 53 which is provided with a guide channel adapted to receive a pair of guide rollers 55 which are attached to operating levers 54. The latter are secured and rotate each with one of a pair of driving gears 30 in mutual meshing engagement, one of said gears corresponding to the gear 30 in Figures 1 to 3. Positions C of the axes of rollers 55 correspond to the closed position of the window as shown in the drawing, while position O indicates the open position, in a manner well understood and known in connection with window operating mechanism of this type. The remaining parts and their operation for manually and/or automatically raising and lowering the window 52 are shown to be equal to and denoted by reference numerals identical to those according to the preceding views.

Referring to Figures 7 and 8, there is shown an alternative type of differential coupling suitable for the purpose of the invention. This modification comprises an internally threaded ring gear or annulus 58 acting as a first sun gear and being fitted with external worm teeth 60 which mesh with the worm 24 driven by the electric motor through shaft 37, in substantially the same manner as in the previous illustrations. A planet gear 61 meshing with the inner gear teeth of annulus 58 rotates on a pin or shaft 62 which is secured to or integral with the differential carrier in the form of an arm 63 radially extending from a shaft 64 to the end which is secured to the window operating gear 28. A further sun or side gear 65 having the outer gear teeth and being of lesser diameter than and arranged co-axially with sun gear 58, also meshes with planet gear 61 as shown and is in turn coupled with the manual operating member or crank 10 (not shown) through a unidirectional clutch which may be of similar type to that shown in the preceding views and of which only segment 17 has been indicated in Figure 7. Although only a single planet gear 61 has been shown in the drawing, a plurality may be provided meshing with the externally and internally threaded sun gears 65 and 58, respectively, in which case carrier 63 may be in the form of a spider having a plurality of radial arms each rotatably supporting one of the planet gears, as will be readily understood. Shaft 64 may again be extended in the opposite direction to provide a centering support for the entire structure, in the manner described hereinabove and shown more clearly in Figure 8. As is furthermore understood, the relation of the sun gears 58 and 65 may be reversed, i. e. gear 58 may be in suitable driving connection with the crank handle 10 and gear 65 may be in driving connection with the electric motor.

According to a further feature of the invention, the differential coupling device and driving motor may be constructed and mounted as a separate unit in spaced relation to the manual operating and driving elements to more evenly distribute or balance the various parts within the available space inside an automobile door and/or to suit other conditions or requirements. Thus, referring to Figure 9, the shaft 64 of the carrier 63 of a differential drive of the type according to Figure 8 is provided with a gear or sprocket 67 integral therewith or secured in any suitable manner, said sprocket cooperating through a chain 71 with a further sprocket gear 73 secured to or integral with a shaft 70 carrying the window operating gear 28. Similarly, sun gear 65 of the differential coupling has attached to it a sprocket 68 which cooperates by way of a chain 72 with a sprocket 74 rotatably supported by the shaft 70 and forming part of or being secured to the segment 17 of a friction clutch or the equivalent connected with the manual operating member or hand crank 10 (not shown) described in previous illustrations. The outer sun gear 58 of the differential drive formed with worm teeth again meshes with the worm 24 driven by the electric motor, whereby the differential coupling and motor may be mounted as a separate unit at a convenient place within an automobile door and connected with a standard window operating mechanism through suitable transmission means, such as chain, belt, gear or other drives, in the manner shown and readily understood by those skilled in the art.

While there have been shown and described a few desirable embodiments of the invention, it will be evident from the foregoing that this disclosure is for the purpose of illustration and that numerous variations and modification in size, shape and arrangement of parts, as well as the substitution of equivalent elements for those herein shown and described, may be made in accordance with the broader scope and spirit of the invention, as set forth in the appended claims. The specification and drawings are accordingly to be regarded in an illustrative rather than in a limiting sense.

I claim:

1. In a mechanism for operating vehicle windows, an electric motor having an output shaft adapted to be driven in either direction, a second output shaft having a hand crank associated therewith for rotating the same manually in either direction, a planetary assembly including a pair of side gears arranged for coaxial rotation, a carrier arranged for rotation coaxially with said side gears, planetary gears carried by said carrier and adapted to run in meshing engagement with each of said side gears, a driven shaft for actuating a window connected to said carrier and adapted to be rotated therewith, irreversible worm gear mechanism drivingly interconnecting said output shaft from said electric motor with one of said side gears, a coupling interconnecting said output shaft from said hand crank with said other side gear, said hand crank and side gear rotating in substantially parallel planes, and means associated with said last mentioned output shaft serving to brake said hand crank side gear when the hand crank is stationary.

2. In a mechanism for operating vehicle windows, an electric motor having an output shaft adapted to be driven in either direction, a second output shaft having a hand crank associated therewith for rotating the same manually in either direction, a planetary assembly including a pair of side gears arranged for coaxial rotation, a carrier arranged for rotation coaxially with said side gears, planetary gears carried by said carrier and adapted to run in meshing engagement with each of said side gears, a driven shaft connected to said carrier and adapted to be rotated therewith, window actuating means at one end of said driven shaft, irreversible worm gear mechanism drivingly interconnecting said output shaft from said electric motor with one of said side gears, a coupling interconnecting said output shaft from said hand crank with said other side gear, and spring means associated with said last mentioned output shaft serving to brake said hand crank side gear when the hand crank is stationary, said spring means and said window actuating means being disposed on opposite sides of said planetary mechanism.

3. In a mechanism for operating vehicle windows, an electric motor having an output shaft adapted to be driven in either direction, a second output shaft having a hand crank associated therewith for rotating the same manually in either direction, a planetary assembly including a pair of side gears arranged for coaxial rotation, a carrier arranged for rotation coaxially with said side gears, planetary gears carried by said carrier and adapted to run in meshing engagement with each of said side gears, a driven shaft for actuating a window connected to said carrier and adapted to be rotated therewith, irreversible worm gear mechanism drivingly interconnecting said output shaft from said electric motor with one of said side gears, a coupling interconnecting said output shaft from said hand crank with said other side gear for rotating said other side gear at substantially the speed of the hand crank and means serving to brake said hand crank side gear against rotation except when the same is actuated by said hand crank.

4. In a mechanism for operating vehicle windows, an electric motor having an output shaft adapted to be driven in either direction, a second output shaft having a hand crank associated therewith for rotating the same manually in either direction, a planetary assembly including a pair of side gears arranged for co-axial rotation, a carrier arranged for rotation co-axially with said side gears, planetary gears carried by said carrier and adapted to run in meshing engagement with each of said side gears, a driven shaft for actuating a window connected to said carrier and adapted to be rotated therewith, irreversible worm gear mechanism drivingly interconnecting said output shaft from said electric motor with one of said side gears, a coupling interconnecting said output shaft from said hand crank with said other side gear, and spring means associated with said last mentioned output shaft serving to brake said hand crank side gear when the hand crank is stationary, said last mentioned means including a stationary housing surrounding said last mentioned output shaft, a coil spring surrounding said shaft and normally tightly engaging said housing, the ends of said spring engaging radial faces on said shaft whereby rotary movement of said shaft by said crank will serve to reduce the diameter of said spring and disengage the same from said housing.

5. In a mechanism for operating vehicle windows, an electric motor having an output shaft adapted to be driven in either direction, a second output shaft having a hand crank associated therewith for rotating the same manually in either direction, a planetary assembly including a pair of side gears arranged for coaxial rotation, a carrier arranged for rotation coaxially with said side gears, planetary gears carried by said carrier and adapted to run in meshing engagement with each of said side gears, a driven shaft for actuating a window connected to said carrier and adapted to be rotated therewith, irreversible worm gear mechanism drivingly interconnecting said output shaft from said electric motor with one of said side gears, a coupling interconnecting said output shaft from said hand crank with said other side gear, and means serving to brake said hand crank side gear except when the same is actuated by said hand crank, said last mentioned means including a stationary housing surrounding said last mentioned output shaft, a coil spring surrounding said shaft and normally tightly engaging said housing, the ends of said spring engaging radial faces on said shaft whereby rotary movement of said shaft by said crank will serve to reduce the diameter of said spring and disengage the same from said housing.

PETER F. ROSSMANN.

REFERENCES CITED

The following references are of record in the file of this patent:

UNITED STATES PATENTS

| Number | Name | Date |
|---|---|---|
| 1,157,307 | Henderson | Oct. 19, 1915 |
| 1,263,125 | Sawyer | Apr. 16, 1918 |
| 1,916,579 | Mosher | July 4, 1933 |
| 1,951,419 | Jacobi | Mar. 20, 1934 |
| 2,001,758 | Zwierzina | Mar. 21, 1935 |
| 2,005,891 | Elberty | June 25, 1935 |
| 2,145,666 | Roethel | Jan. 31, 1939 |
| 2,324,145 | Floraday | July 13, 1943 |
| 2,331,260 | Wiseman | Oct. 5, 1943 |

FOREIGN PATENTS

| Number | Country | Date |
|---|---|---|
| 265,286 | Switzerland | Mar. 1, 1950 |